United States Patent
Faruque et al.

(10) Patent No.: US 11,554,647 B1
(45) Date of Patent: Jan. 17, 2023

(54) BARS MOVABLE ACROSS VEHICLE DOOR OPENING

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US); Rahul Arora, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/411,381

(22) Filed: Aug. 25, 2021

(51) Int. Cl.
*B60J 5/04* (2006.01)

(52) U.S. Cl.
CPC .................. *B60J 5/0443* (2013.01)

(58) Field of Classification Search
CPC ....... B60J 5/0443; B62D 21/157; B60R 19/42
USPC ............. 296/187.12, 147, 150, 146.1, 146.6; 293/128
See application file for complete search history.

(56) References Cited

U.S. PATENT DOCUMENTS

| | | | |
|---|---|---|---|
| 4,217,715 A | 8/1980 | Bryan, Jr. | |
| 4,437,697 A * | 3/1984 | Hinojos | B60R 13/04 293/118 |
| 5,421,625 A | 6/1995 | Arko | |
| 6,517,110 B1 | 2/2003 | Butters et al. | |
| 7,077,440 B1 * | 7/2006 | Morales | B60R 19/42 293/127 |
| 7,234,765 B1 | 6/2007 | Mazzei et al. | |
| 7,243,983 B2 | 7/2007 | Rashidy et al. | |
| 7,354,083 B1 * | 4/2008 | Obermann | B60R 19/565 293/126 |
| 7,472,922 B2 | 1/2009 | Wu | |
| 9,688,312 B2 | 6/2017 | Maeshiro et al. | |
| 10,632,951 B2 | 4/2020 | Nusier et al. | |
| 10,906,488 B2 | 2/2021 | Santiago | |
| 2005/0110236 A1 | 5/2005 | Stevenson | |
| 2007/0187992 A1 | 8/2007 | Brockhoif | |
| 2009/0278363 A1 | 11/2009 | Browne et al. | |
| 2015/0291116 A1 * | 10/2015 | Pi | B60R 13/04 293/118 |

FOREIGN PATENT DOCUMENTS

| | | |
|---|---|---|
| EP | 3342609 B1 | 11/2019 |
| GB | 2579382 A | 6/2020 |
| GB | 2579383 A | 6/2020 |
| JP | 3765274 B2 | 4/2006 |
| KR | 101879574 B1 | 7/2018 |

OTHER PUBLICATIONS

Notice of Allowance for U.S. Appl. No. 17/522,210 as issued by the USPTO dated Nov. 25, 2022.

* cited by examiner

*Primary Examiner* — Joseph D. Pape
(74) *Attorney, Agent, or Firm* — Frank A. MacKenzie; Bejin Bieneman PLC (57) ABSTRACT

An assembly for a vehicle includes a front pillar and a rear pillar spaced along a vehicle-longitudinal axis. The pillars define a door opening. The assembly includes a first track supported by the front pillar and a second track supported by the rear pillar. The assembly includes a bar movably engaged with the first track and the second track. The bar is movable between a lowered position and a raised position. The bar is elongated completely across the door opening in the raised position.

18 Claims, 8 Drawing Sheets

BARS MOVABLE ACROSS VEHICLE DOOR OPENING

BACKGROUND

A vehicle may include amenities that allow occupants ingress and egress of the vehicle. For example, a vehicle may not include a B-pillar to allow more space for occupants to ingress and egress the vehicle. Specifically, such vehicles may include two doors that meet at the location traditionally occupied by the B-pillar when in a closed position. The door may be rotatable about the A-pillar and the C-pillar, respectively, such that the doors rotate away from each other to an open position.

DETAILED DESCRIPTION

An assembly includes a front pillar and a rear pillar spaced along a vehicle-longitudinal axis. The pillars define a door opening. The assembly includes a first track supported by the front pillar and a second track supported by the rear pillar. The assembly includes a bar movably engaged with the first track and the second track. The bar is movable between a lowered position and a raised position. The bar is elongated completely across the door opening in the raised position.

The assembly may include a pair of doors supported by the front pillar and the rear pillar in the door opening, the doors being movable between an open position and a closed position, the bar being in the raised position when the doors are in the open position and the bar in the lowered position when the doors are in the closed position.

The bar may be adjacent the doors when the doors are in the closed position and the bar is in the raised position, and the bar is below the doors when the doors are in the open position and the bar is in the lowered position.

The assembly may include a pair of doors supported by the front pillar and the rear pillar in the door opening, the bar being vehicle-inboard of the doors when the doors are in a closed position and the bar is in the raised position.

The assembly may include second bar movably engaged with the front pillar and the rear pillar, the second bar being movable along the front pillar and the rear pillar between a lowered position to a raised position, the second bar elongated completely across the door opening in the raised position.

The bar and the second bar may be spaced from each other in the raised positions.

The assembly may include a rocker extending from the front pillar to the rear pillar and defining a slot elongated from the front pillar to the rear pillar, the slot receiving at least one of the bar and the second bar in the lowered positions.

The bar and the second bar may be vehicle-inboard of the door opening.

The second bar may be moveably engaged with the first track and the second track.

The assembly may include a rocker extending from the front pillar to the rear pillar, the bar being elongated along the rocker in the raised position and the lowered position.

The rocker may define a slot elongated from the front pillar to the rear pillar, the slot receiving the bar when the bar is in the lowered position.

The assembly may include a vehicle floor supported by the rocker, the slot being between the vehicle floor and the rocker.

The assembly may include a vehicle floor supported by the rocker, the bar being between the vehicle floor and the rocker in the lowered position.

The bar may be vehicle-inboard of the rocker.

The bar may be vehicle-inboard of the door opening.

The first track and the second track may each extend generally vertically along the front pillar and the rear pillar, respectively.

The assembly may include a computer including a processor and a memory storing instructions executable by the processor to identify a position of a pair of doors supported by the front pillar and the rear pillar of a vehicle as being in a closed position or an open position, identify the vehicle is in Drive; and move the bar elongated from the front pillar and the rear pillar from the lowered position to the raised position based on at least the identification of the doors being in the closed position or the identification of the vehicle being in Drive.

The instructions may include to identify the vehicle is in Park and move the bar from the raised position to the lowered position based on at least one of identification of the doors being in the open position or identification of the vehicle being in Park.

With reference to the Figures, wherein like numerals indicate like parts throughout the several views, an assembly 10 for a vehicle 12 includes a front pillar 14 and a rear pillar 16 spaced along a vehicle-longitudinal axis L. The pillars 14, 16 define a door opening 18. The assembly 10 includes a first track 20 supported by the front pillar 14 and a second track 22 supported by the rear pillar 16. The assembly 10 includes a bar 24 movably engaged with the first track 20 and the second track 22. The bar 24 is movable between a lowered position and a raised position. The bar 24 is elongated completely across the door opening 18 in the raised position.

The bar 24 may be moved into the raised position when the vehicle 12 is in motion and lowered when the vehicle 12 has stopped. In the raised position and in the event of an impact to the vehicle 12, the bar 24 extending completely across the door opening 18 limits the intrusion into the vehicle 12 when the vehicle 12 does not have a B-pillar. The bar 24 may provide reinforcement to the side of the vehicle 12 when the vehicle 12 does not have a B-pillar by limiting intrusion into the vehicle 12 in the event of the impact. When the vehicle 12 is no longer in motion, the bar 24 moves to the lowered position to allow occupants of the vehicle 12 to enter and exit the vehicle 12 through the door opening 18.

Figure 1:
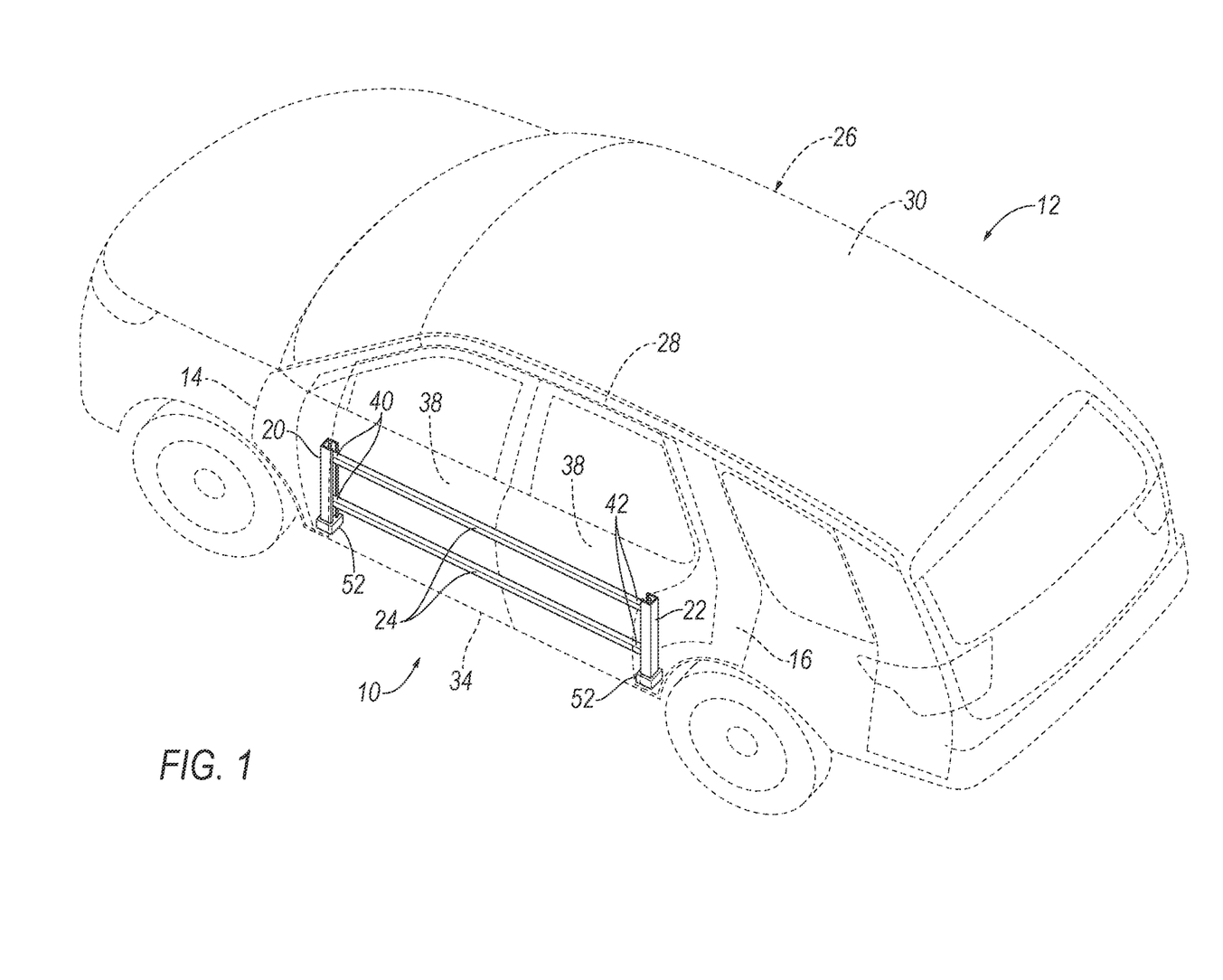
FIG. 1 is a perspective view of a vehicle having a pair of bars movable adjacent a pair of vehicle doors with the bars in a raised position.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a vehicle frame (not numbered) and a vehicle body 26. The vehicle frame and the vehicle body 26 may be of a unibody construction in which the frame is unitary with a vehicle body 26 (including frame rails, pillars 14, 16, roof rails 28, etc.). As another example, the vehicle body 26 and vehicle frame may have a body-on-frame construction (also referred to as a cab-on-frame construction) in which the vehicle body 26 and frame are separate components, i.e., are modular, and the vehicle body 26 is supported on and affixed to the frame. Alternatively, the vehicle frame and vehicle body 26 may have any suitable construction. The vehicle frame and vehicle body 26 may be of any suitable material, for example, steel, aluminum, and/or fiber-reinforced plastic, etc.

The vehicle body 26 may define a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

With continued reference to FIG. 1, the vehicle body 26 includes two roof rails 28. The roof rails 28 are spaced from one another in a cross-vehicle direction. The roof rails 28 each extend longitudinally along the vehicle body 26, i.e., along a vehicle-longitudinal axis L.

The vehicle body 26 includes a vehicle roof 30. The vehicle roof 30 may define the upper boundary of the passenger compartment and may extend from the front end of the passenger compartment to the rear end of the passenger compartment. The vehicle roof 30 may extend from one roof rail 28 to the other roof rail 28. The vehicle roof 30 may be irremovably fixed to the roof rails 28. In other words, the vehicle roof 30 is secured to the roof 30 fails in such a way that removal requires destruction such as cutting, e.g., cutting material and/or welded joints, etc. As an example, the vehicle roof 30 may be attached to both roof rails 28, e.g., by welding, fasteners, etc.

With reference to FIGS. 1-4, the vehicle body 26 includes a vehicle floor 32 spaced downwardly from the vehicle roof 30. The vehicle floor 32 may define the lower boundary of the passenger compartment and may extend from the front end of the passenger compartment to the rear end of the passenger compartment. The vehicle floor 32 may include a floor panel and upholstery on the vehicle floor 32. The upholstery may be, for example, carpet, and may have a class-A surface facing the passenger compartment, i.e., a surface specifically manufactured to have a high quality, finished, aesthetic appearance free of blemishes. The vehicle floor 32 may include cross-beams (not shown) connected to the floor panel and to other components of the vehicle body 26.

The vehicle body 26 may include pillars 14, 16, spaced from each along the vehicle-longitudinal axis L on both sides of the vehicle body 26. Specifically, the vehicle body 26 includes the front pillar 14, e.g., an A-pillar, and the rear pillar 16 (which may be referred to as a C-pillar even in examples where there is no B-pillar) spaced vehicle-rearward from the front pillar 14 on each side of the vehicle body 26. For example, the vehicle body 26 includes a front pillar 14 and a rear pillar 16 on each side of the vehicle 12 with the front pillar 14 being spaced from the rear pillar 16. In other words, the front pillar 14 may be disposed at the front end of the passenger compartment. The pillars 14, 16 may extend from the vehicle roof 30 to the vehicle floor 32. The vehicle 12 may include other pillars 14, 16 in addition to the front pillar 14 and the rear pillar 16. For example, as shown in the Figures, the vehicle 12 may include a D-pillar disposed at the rear end of the passenger compartment on each side of the vehicle 12.

With continued reference to FIGS. 1-4, the vehicle body 26 includes rockers 34 extending from the front pillar 14 to the rear pillar 16. Specifically, the vehicle body 26 may include two rockers 34, one on each side of the vehicle body 26. The rockers 34 are elongated along the vehicle-longitudinal axis L. The vehicle 12 may include two rockers 34, i.e., one rocker 34 on either side of the passenger compartment. The rockers 34 are spaced from the roof rails 28 below the roof rails 28. The rockers 34 are below the passenger compartment. In some examples, the rockers 34 may be connected to the pillars 14, 16, in any suitable way, e.g., welding, adhesive, fasteners, etc. In other words, in such examples, the rockers 34 and the pillars 14, 16, are separate from each other and connected to each other. In other examples, the rockers 34 may be unitary with the pillars 14, 16, i.e., a single, uniform piece of material with no seams, joints, fasteners, or adhesives holding it together. In such an example, the pillars 14, 16 and the rocker 34 may be formed together simultaneously as a single continuous unit, e.g., by molding, forging, casting, stamping, etc. The vehicle floor 32 may be supported by the rockers 34.

The vehicle body 26 may defines the door opening 18. Specifically, the vehicle body 26 may include one or more door opening 18 between pillars 14, 16, of the vehicle body 26. The door opening 18 may be between the front pillar 14 and the rear pillar 16 and between the rocker 34 and the roof rail 28. In other words, the pillars 14, 16, are spaced from each other by the door opening 18 and the roof rail 28 and rocker 34 are spaced from each other by the door opening 18. The door opening 18 extends uninterrupted from the front pillar 14 to the rear pillar 16. The door opening 18 extends uninterrupted from the rocker 34 to the roof rails 28. The door opening 18 allows for ingress and egress into the passenger compartment. The vehicle 12 may include any suitable number of door openings 18 to allow for ingress and egress into the passenger compartment. For example, as shown in the Figures, the vehicle 12 may include a door opening 18 on each side of the vehicle 12. In other examples, the vehicle 12 may include multiple door openings 18 on each side of the vehicle 12.

Figure 2:
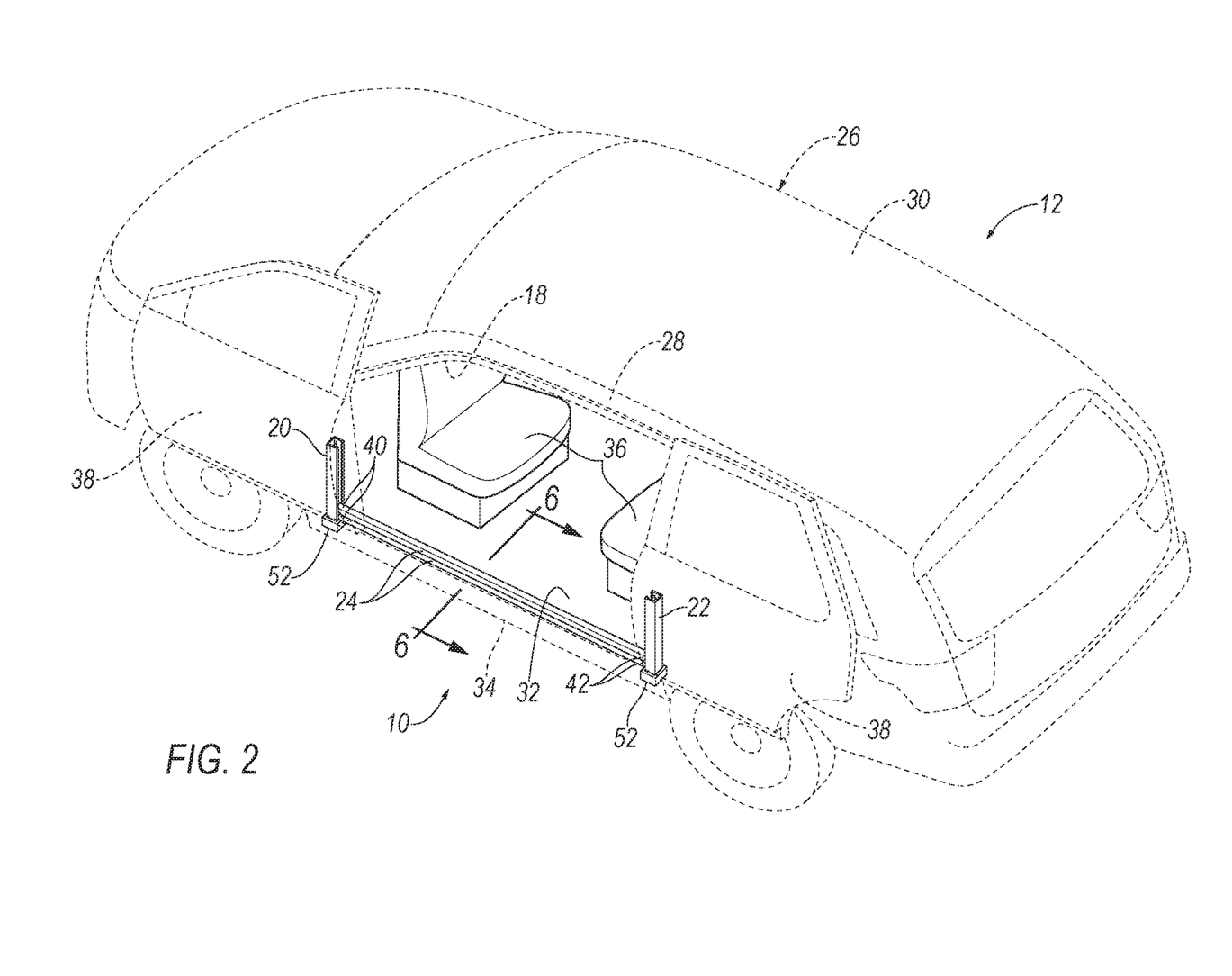
FIG. 2 is a perspective view of the vehicle having the pair of bars movable adjacent the pair of the vehicle doors with the bars in a lowered position.
Figure 3:
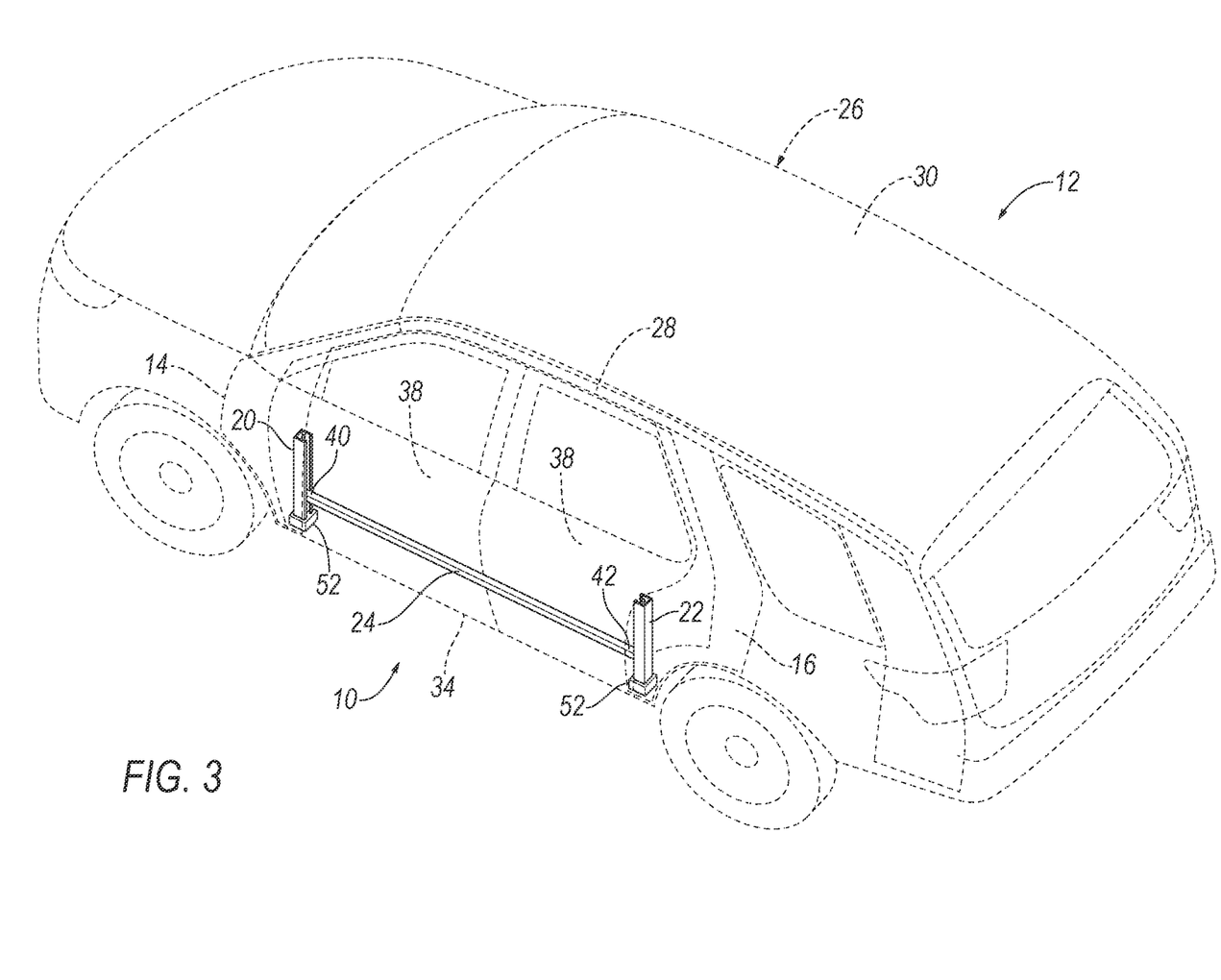
FIG. 3 is a perspective view of the vehicle having a bar movable adjacent the pair of vehicle doors with the bar in a raised position.
Figure 4:
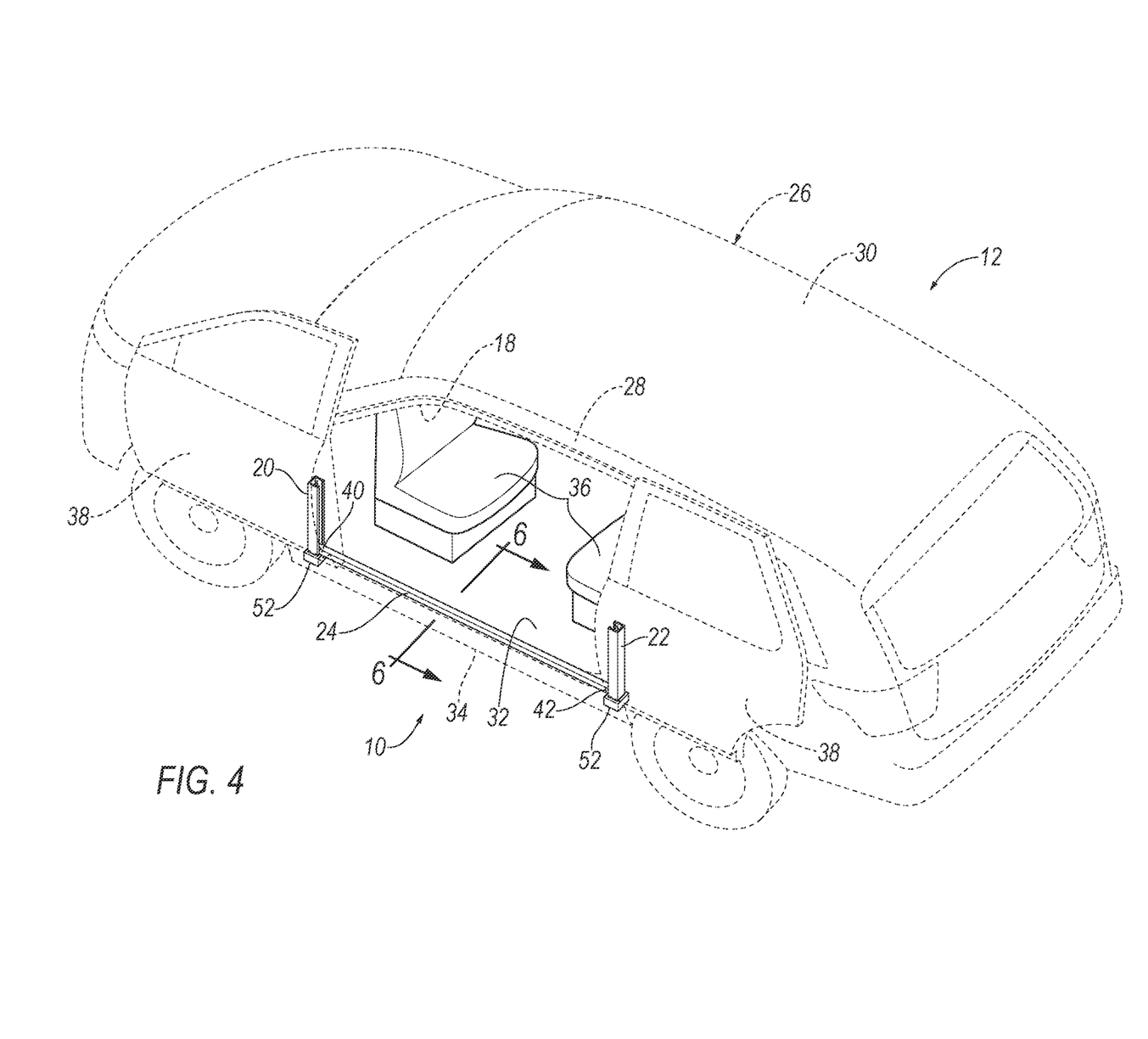
FIG. 4 is a perspective view of the vehicle having the bar movable adjacent the pair of doors with the bar in the lowered position

With reference to FIGS. 2 and 4, the vehicle body 26 may not include a middle pillar between the front pillar 14 and the rear pillar 16, i.e., the vehicle body 26 may not include a middle pillar, e.g., a B-pillar, between the front pillar 14 and the rear pillar 16 from the vehicle floor 32 to the vehicle roof 30. In other words, the vehicle body 26 is B-pillarless. The vehicle body 26 lacking a middle pillar allows for the door opening 18 to extend from the front pillar 14 to the rear pillar 16. The door opening 18 extending from the front pillar 14 to the rear pillar 16 allows occupants easier access to the passenger compartment for ingress and egress.

The vehicle 12 may include one or more seats 36. Specifically, the vehicle 12 may include any suitable number of seats 36. The seats 36 are supported by the vehicle floor 32. The seats 36 may be arranged in any suitable arrangement in the passenger compartment. As in the example shown in the Figures, one or more of the seats 36 may be at the front end of the passenger compartment, e.g., a driver seat 36 and/or a passenger seat 36. In other examples, one or more of the seats 36 may be behind the front end of the passenger compartment, e.g., at the rear end of the passenger compartment. The seats 36 may be movable relative to the vehicle floor 32 to various positions, e.g., movable fore-and-aft and/or cross-vehicle. The seat 36 may be of any suitable type, e.g., a bucket seat 36. The seats 36 may be adjacent the door openings 18 in the vehicle body 26.

With continued reference to FIGS. 1-4, the vehicle 12 includes a plurality of doors 38, e.g., a front door 38 and a rear door 38 on each side of the vehicle body 26, movable from a closed position to an open position for vehicle 12 occupants to enter and exit a passenger compartment. The front door 38 may be supported by the front pillar 14 and the rear door 38 may be supported by the rear pillar 16 in the door opening 18. In the closed position, the doors 38 are in at least one of the door openings 18 in the vehicle body 26. In the example shown in FIGS. 1-4, the first door 38 and the second door 38 are both in the single door opening 18 in the vehicle body 26. In the open position, at least one of the door openings 18 in the vehicle body 26 may be exposed. Each of the doors 38 are adjacent a seat 36 in the vehicle 12. Each of the front seats 36 and each of the rear seats 36 may be adjacent a door 38 of the vehicle 12. Specifically, each front seat 36 may be adjacent a front door 38 and each rear seat 36 may be adjacent a rear door 38. The doors 38 are vehicle-outboard from each of the front seats 36 and each of the rear seats 36.

As shown in the example in FIGS. 1-4, the doors 38 may be slidably supported by the vehicle body 26. For example, the vehicle body 26 may include a track with the doors 38 being slidably supported by the track. Each of the doors 38 is movable, i.e., slidable, from the closed position to the open position. In the closed position, the doors 38 on each side of the vehicle 12, i.e., the front door 38 and the rear door 38, are adjacent each other. As the doors 38 move to the open position, the front door 38 moves away from the rear door 38 toward the front end of the passenger compartment and the rear door 38 moves away from the front door 38 toward the rear end of the passenger compartment.

The numerical adverbs "first" and "second" with respect to the doors 38 are used herein merely as identifiers and do not signify order or importance. The terms "first" and second" may be used interchangeably when referring to the doors 38 as shown in the Figures.

The roof rails 28 contact a top edge (not numbered) of the doors 38 when the doors 38 are in the closed position. Each door 38 includes at least one door 38 panel (not numbered) and a door-trim panel (not shown) supported on the door 38 panel. Specifically, the door 38 may include two panels, namely a door inner (not shown) and a door outer (not numbered). In such an example, the door-trim panel and the door outer are fixed to the door inner. The door-trim panel is positioned opposite the door outer relative to a door frame. The door-trim panel is inboard relative to the door inner, and the door outer is outboard relative to the door inner. The door 38 includes a window door opening (not numbered) that may be completely closed by a window (not numbered) when the window is in a fully raised position. The window door opening is defined by the door-trim panel and door outer on a bottom edge and either by the door inner circumscribing the window door opening or by the vehicle body 26, e.g., the A pillar, the B pillar, and the roof rail 28. The door outer faces outboard relative to the vehicle 12.

The door outer may define a portion of the exterior of the vehicle 12. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.).

The door inner may be metal (such as steel, aluminum, etc.) or polymeric (such as fiber reinforced plastic composite, etc.). The door inner provides structural rigidity for the door outer. The door inner may provide a mounting location for components of the door 38.

With reference to FIGS. 1-6, the assembly 10 may include one or more bars 24 movable relative to the pillars 14, 16 from the lowered position to the raised position. In the example shown in FIGS. 1, 2, 5, and 6, the assembly 10 includes a pair of bars 24 extending completely across the door opening 18. In the example shown in FIGS. 3 and 4, the assembly 10 may include one bar 24 extending completely across the door opening 18. The assembly 10 may include any suitable number of bars 24 extending completely across the door opening 18. The number of bars 24 extending across the door opening 18 may be dependent on the height and type of vehicle 12. A pair of bars 24 may be used for vehicles 12 having a higher beltline. One single bar 24 may be used for vehicles 12 having a lower beltline. The bars 24, in the raised positions, limit intrusion into the passenger compartment in the event of an impact to the vehicle 12.

The bars 24 extend from the front pillar 14 to the rear pillar 16 in the raised position and the lowered position. Specifically, the bars 24 extend from a first end 40 supported by the front pillar 14 to a second end 42 supported by the rear pillar 16. The bars 24 extend from one side of the door opening 18 to the other side of the door opening 18. In other words, the bars 24 are elongated completely across the door opening 18 in the raised position. Specifically, the bars 24 extend continuously, i.e., unbroken, from the front pillar 14 to the rear pillar 16 in both the lowered position and the raised position. The bar 24 is vehicle-inboard of the door opening 18.

The bars 24 may be elongated along the rocker 34 when the bars 24 are in the raised position and the lowered position. Specifically, the bars 24 are elongated from the front pillar 14 to the rear pillar 16 along the rocker 34 when the bars 24 are in the lowered position and the raised position. The bars 24 may be vehicle-inboard of the rocker 34. Specifically, the bars 24 may be on a vehicle-inboard side of the rocker 34 both in the lowered position and the raised position.

The bars 24 are elongated adjacent the doors 38 of the vehicle 12. The bars 24 are in the raised position when the doors 38 are in the closed position, e.g., when the vehicle 12 is in motion, and the bars 24 are in the lowered position when the doors 38 are in the open position, e.g., when the vehicle 12 is no longer in motion. When the doors 38 are in the closed position and the bars 24 are in the raised position, the bars 24 are adjacent the doors 38. Specifically, when the doors 38 are in the closed position and the bars 24 are in the raised position, the bars 24 are vehicle-inboard of the doors 38. When the doors 38 are in the open position, the bars 24 are below the doors 38 and in the lowered position.

With reference to FIGS. 1-5, the assembly 10 includes the first track 20 supported by the front pillar 14 and the second track 22 supported by the rear pillar 16. Specifically, the first track 20 is supported by the front pillar 14 and the second track 22 is supported by the rear pillar 16. The tracks 20, 22 may extend upwardly from the vehicle floor 32 toward the vehicle roof 30. Specifically, the tracks 20, 22 each extend generally vertically along the front pillar 14 and the rear pillar 16. The adverb "generally" means that the tracks 20, 22 may deviate from vertical due to manufacturing or architecture of the vehicle body 26. In the example shown in the Figures, the tracks 20, 22 may include a "C" shaped cross-section, but the tracks 20, 22 may be of any suitable cross-section.

The tracks 20, 22 may be exposed to the passenger compartment. In other words, the assembly 10 does not include trim panels that cover the tracks 20, 22 in the vehicle 12. The assembly 10 may include rubber covers (not shown) over the tracks 20, 22 to conceal any mechanism inside the track.

The assembly 10 may include any suitable number of tracks 20, 22 supported by the pillars 14, 16. As shown in the example in the Figures, a single track 20 may be supported by the front pillar 14 and a single track 22 may be supported by the rear pillar 16. In such an example, the bars 24 are both movable relative to the tracks 20, 22 supported by the pillars 14, 16. In other examples, multiple tracks 20, 22 may be supported by the front pillar 14 and multiple tracks 20, 22 may be supported by the rear pillar 16. In such examples, each bar 24 may be supported by one track supported by the pillars 14, 16, i.e., the number of tracks 20, 22 supported by each pillar may be equal to the number of bars 24 movable relative to the pillars 14, 16.

As previously discussed above, the bars 24 are movable relative to the front pillar 14 and the rear pillar 16. The bars 24 are movably engaged with the front pillar 14 at the first end 40 and the rear pillar 16 at the second end 42. Specifically, the first end 40 of the bars 24 are movably engaged with the first track 20 at the front pillar 14 and the second end 42 of the bars 24 are movably engaged with the second track 22 at the rear pillar 16. The ends 40, 42 of the bars 24 each move along each of the pillars 14, 16, e.g., along the tracks 20, 22, as the bars 24 move from the lowered position to the raised position.

Figure 5:
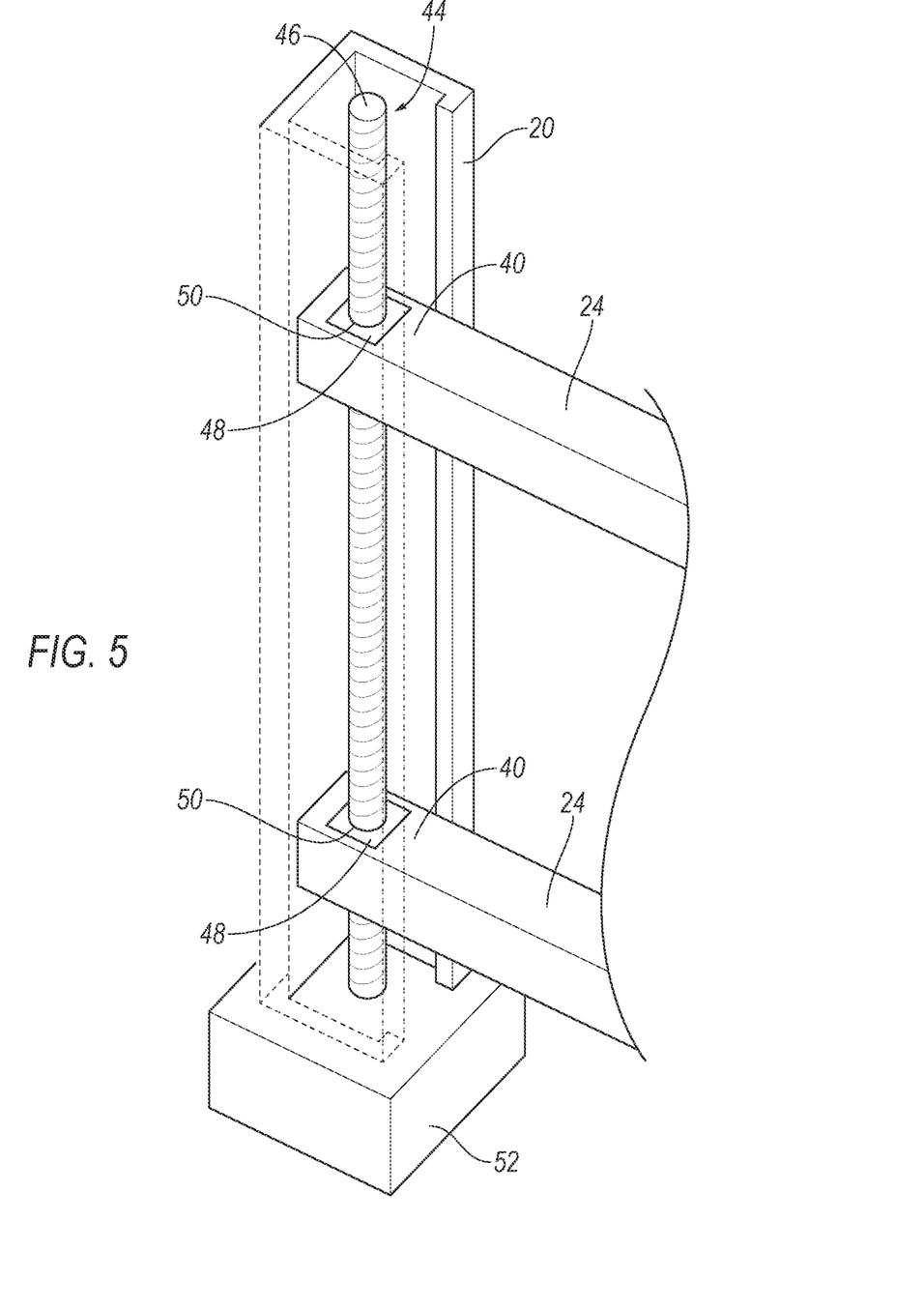
FIG. 5 is a perspective view of the pair of bars movable adjacent the pair of doors, the bars movable along a track.

With reference to FIG. 5, the assembly 10 may include one or more linear actuator 44 fixed to one or more of the tracks 20, 22 and drivably coupled to the bars 24 to move the bars 24 along the tracks 20, 22 between the raised position and the lowered position. Specifically, as shown in the example in the Figures, the assembly 10 may include a linear actuator 44 coupled to the bars 24 at the first end 40 to move the bars 24 along the first track 20 and a second linear actuator 44 coupled to the bars 24 at the second end 42 to move the bars 24 along the second track 22. Each of the linear actuators 44 may move simultaneously such that the first end 40 and the second end 42 each move simultaneously. In other words, the linear actuators 44 at each of the first end 40 and the second end 42 move the first end 40 and the second end 42 at the same rates.

As shown in the example in the Figures, the linear actuator 44 may include a lead screw 46 extending along the tracks 20, 22, i.e., from a bottom of the tracks 20, 22 to a top of the tracks 20, 22. The bars 24 include a carriage 50 at each of the ends 40, 42 of the bars 24 that allows the bars 24 to move along the lead screw 46 to a predetermined height. The linear actuator 44 may include an electric motor 52 fixed to each of the tracks 20, 22, e.g., for driving the lead screw 46 or equivalent mechanism. The electric motor 52 may rotate the lead screw 46 to move the bars 24 between the lowered position and the raised position. The carriage 50 carries the bars 24 along the threading of the lead screw 46 to move bars 24 along the tracks 20, 22. The threading of the lead screw 46 may be tuned to adjust the rate at which the bars 24 may move along the tracks 20, 22. The linear actuator 44 may be in communication with a sensor (not shown) identifying the location of the bars 24 along the tracks 20, 22. In other examples, the linear actuator 44 may include any suitable mechanism to move the bars 24 from the lowered position to the raised position.

In examples such as shown in the Figures, one or more of the bars 24 may include a clutch 48 that releases when the bar 24 reaches a desired height. The clutch 48 allows the bars 24 to move to different heights along the tracks 20, 22. For example, the tracks 20, 22 may include a stop (not shown) that stops one of the bars 24 at a height, in which case the clutch 48 allows the lead screw 46 to continue to rotate without transmitting rotation to the carriage 50 on one of the bars 24 so that the lead screw 46 may continue to rotate and move the other of the bars 24.

Figure 6:
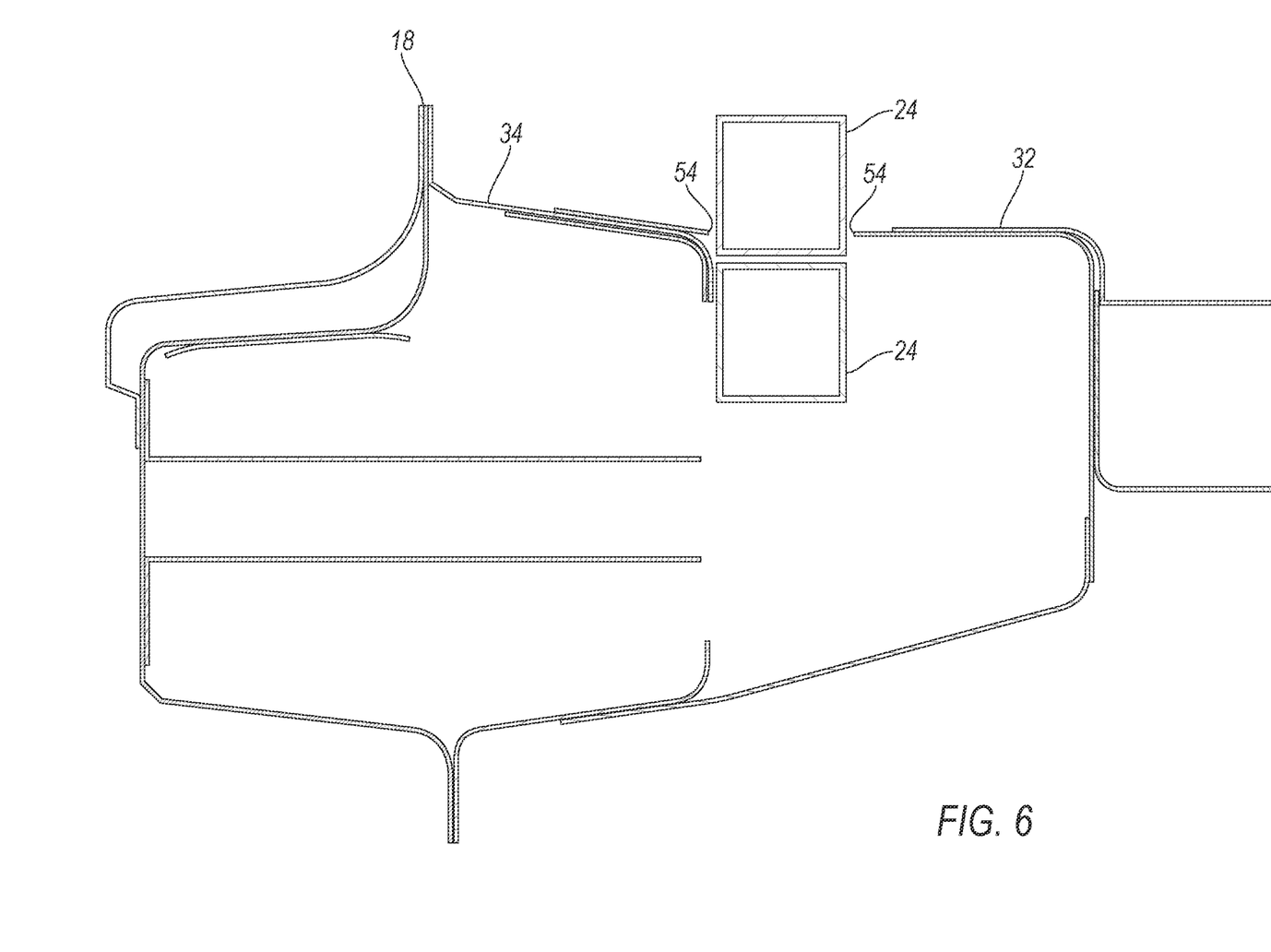
FIG. 6 is a cross-sectional view through line 6 of FIG. 2.

With reference to FIG. 6, a cross-sectional view through line 6 of FIG. 2, the rocker 34 may define a slot 54 elongated from the front pillar 14 to the rear pillar 16. The slot 54 may be between the vehicle floor 32 and the rocker 34. The slot 54 may be sized and shaped to receive at least one of the bars 24 when the bars 24 are in the lowered positions. In the example shown in FIGS. 2 and 6, the bars 24 are both received by the slot 54 in the rocker 34 when the bars 24 are in the lowered positions. In other examples, such as examples including only one bar 24, the bar 24 is received by the slot 54 in the rocker 34 when the bar 24 is in the lowered position.

The vehicle 12 may include any suitable number of assemblies 10 supported by the vehicle body 26. For example, the vehicle 12 may include an assembly 10 on each side of the passenger compartment. Each of the assemblies 10 on each side of the vehicle 12 may be identical to each other except being supported by opposite sides of the vehicle 12 with each assembly 10 being constructed as described above.

Figure 7:
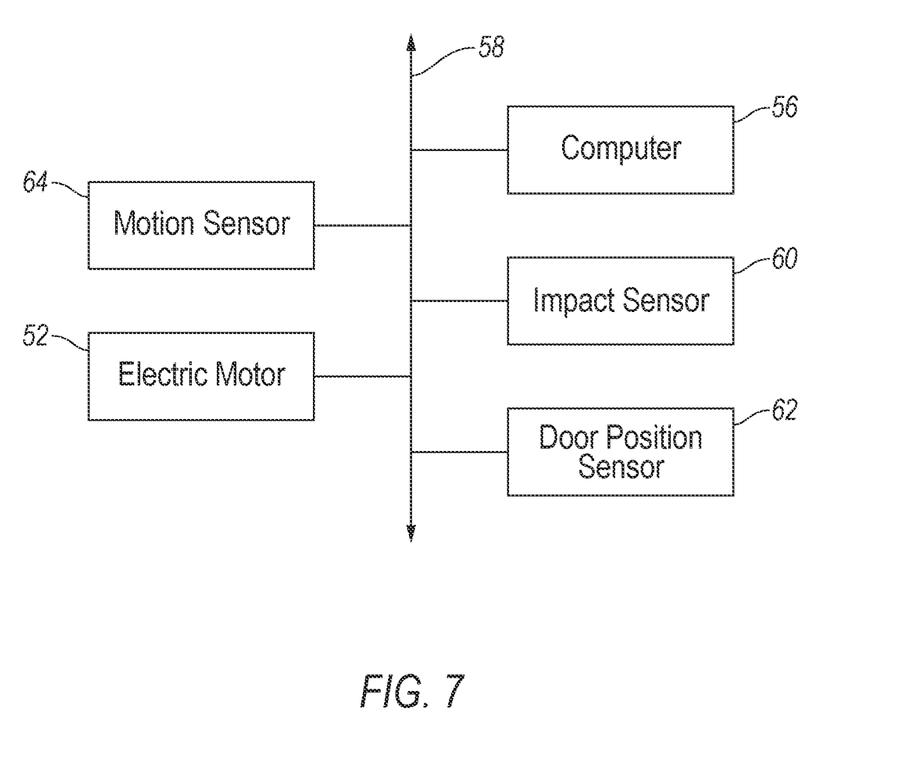
FIG. 7 is block diagram of a vehicle communication network of the vehicle.

The computer 56 includes a processor and a memory. The memory includes one or more forms of computer readable media, and stores instructions executable by the processor for performing various operations, including as disclosed herein. For example, the computer 56 can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer 56 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 56. The memory can be of any type, e.g., hard disk drives, solid state drives, servers, or any volatile or non-volatile media. The memory can store the collected data sent from the sensors. The memory can be a separate device from the computer 56, and the computer 56 can retrieve information stored by the memory via a network in the vehicle 12, e.g., over a CAN bus, a wireless network, etc. Alternatively or additionally, the memory can be part of the computer 56, e.g., as a memory of the computer 56. The computer 56 may include programming to operate one or more of vehicle brakes, propulsion e.g., control of acceleration in the vehicle 12 by controlling one or more of an internal combustion engine, electric motor, hybrid engine, etc., steering, climate control, interior and/or exterior lights, etc., as well as to determine whether and when the computer 56, as opposed to a human operator, is to control such operations. Additionally, the computer 56 may be programmed to determine whether and when a human operator is to control such operations. The computer 56 may include or be communicatively coupled to, e.g., via a vehicle network such as a communications bus as described further below, more than one processor, e.g., included in components such as sensors, electronic control units (ECUs) or the like included in the vehicle 12 for monitoring and/or controlling various vehicle components, e.g., a powertrain controller, a brake controller, a steering controller, etc. As shown in FIG. 7, the computer 56 is generally arranged for communications on a vehicle communication network 58 that can include a bus in the vehicle 12 such as a controller area network CAN or the like, and/or other wired and/or wireless mechanisms. Alternatively or additionally, in cases where the computer 56 actually comprises a plurality of devices, the vehicle communication network 58 may be used for communications between devices represented as the computer 56 in this disclosure. Further, as mentioned below, various controllers and/or sensors may provide data to the computer 56 via the vehicle communication network 58.

The vehicle 12 may include at least one impact sensor 60 for sensing impact of the vehicle 12, and the computer 56 in communication with the impact sensor 60. Alternatively or additionally to sensing impact, the impact sensor 60 may be configured to sense impact prior to impact, i.e., pre impact sensing. The impact sensor 60 is configured to detect an impact to the vehicle 12. The impact sensor 60 may be of any suitable type, for example, post contact sensors such as accelerometers, pressure sensors, and contact switches; and pre impact sensors such as radar, LIDAR, and vision sensing systems. The vision sensing systems may include one or more cameras, CCD image sensors, CMOS image sensors, etc. The impact sensor 60 may be located at numerous points in or on the vehicle 12.

The vehicle 12 may include door position sensors 62 to determine the position of the doors 38, i.e., door position sensors 62 may indicate whether the doors 38 are in the open position or the closed position. The door position sensors 62 may be in communication with the computer 56. The door position sensors 62 may send a signal to the computer 56 to indicate whether the doors 38 are in the open position or the closed position. The vehicle 12 may include any suitable number of door position sensors 62 to determine the position of multiple doors 38 in the vehicle 12. In other words, the vehicle 12 may include a number of door position sensors 62 equal to the number of doors 38 in the vehicle 12.

The bars 24 may move to the raised position and the lowered position based on motion of the vehicle 12. The bars 24 may move to the raised position in the event of powered movement of the vehicle 12 in either a vehicle-forward direction, e.g., Drive, or a vehicle-rearward direction, e.g., Reverse. The bars 24 may move to the lowered position in the event of ceasing powered movement of the vehicle 12 in the vehicle-forward direction or vehicle-rearward direction.

As an example, the vehicle 12 may include a transmission (not shown) that may be shifted between gears for driving the vehicle 12 to indicate the direction of motion of the vehicle 12. The transmission may be shifted to Park, Reverse, Neutral, or Drive by a driver of the vehicle 12. The transmission be shifted to gears other than those gears previously listed depending on the type of vehicle 12 and the engine of the vehicle 12. In other examples, the vehicle 12 may include motors (not shown) that indicate the powered movement of the vehicle 12 in the vehicle-forward direction or the vehicle-rearward direction. The vehicle 12 may include motion sensors 64 that identify whether the vehicle 12 is moving in the vehicle-forward direction or in the vehicle-rearward direction, e.g., Drive versus Reverse, or whether the vehicle 12 is no longer in motion, e.g., Park. The motion sensors 64 may be in communication with the computer 56 to indicate whether the vehicle 12 may be in motion.

Figure 8:
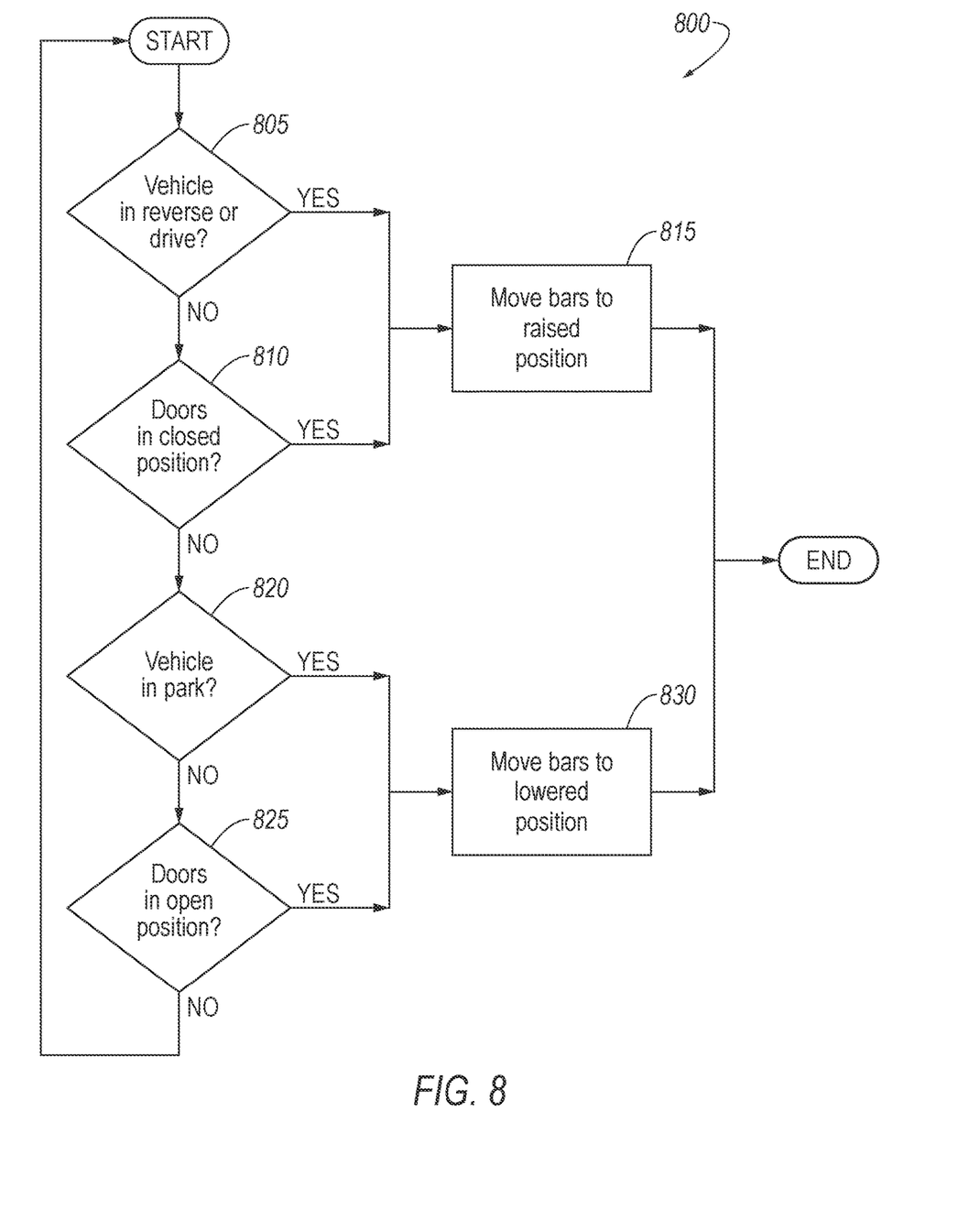
FIG. 8 is a flow chart of a method for moving the pair of bars from the lowered position to the raised position.

With reference to FIG. 8, the computer 56 stores instructions to control components of the vehicle 12 according to the method 800 shown in FIG. 8. Specifically, as shown in FIG. 8, the method 800 includes instructions for moving the bars 24 from the lowered position to the raised position and from the raised position to the lowered positions based on other conditions.

With reference to decision block 805, the method 800 includes identifying whether the vehicle 12 is in Drive or Reverse. In other words, the method 800 includes identifying whether the vehicle 12 may be in motion in the vehicle-forward direction or in the vehicle-rearward direction. The motion sensors 64 may send a signal to the computer 56 indicating the direction of the motion of the vehicle 12. If the vehicle 12 is not identified as being in Drive or Reverse, the method 800 moves to decision block 810.

With reference to decision block 810, if the vehicle 12 is not identified as being in Drive or Reverse, the method 800 includes to identify the position of the doors 38 supported by the front pillar 14 and the rear pillar 16 of the vehicle 12 as being in the closed position. The door position sensors 62 may send a signal to the computer 56 indicating the position of the doors 38. If the doors 38 are not identified as being in the closed position, the method 800 moves to decision block 820.

With reference to block 815, based on identifying the vehicle 12 is in Drive or Reverse or upon identifying the position of the doors 38 as being in the closed position, the method 800 includes to move the bars 24 elongated from the front pillar 14 to the rear pillar 16 from the lowered position to the raised position. The computer 56 may send a signal over the vehicle communication network 58 to the electric motors 52 to rotate the lead screw 46 to move the bars 24 to the raised positions.

With reference to decision block 820, if the doors 38 are not identified as being in the closed position, the method 800 includes identifying whether the vehicle 12 is in Park. In other words, the method 800 includes identifying whether the vehicle 12 may be stationary or allowing passengers to enter or exit the passenger compartment. The motion sensors 64 may send a signal to the computer 56 to indicate the vehicle 12 is in Park. If the vehicle 12 is not identified as being in Park, the method 800 moves to decision block 825.

With reference to decision block 825, if the vehicle 12 is not identified as being in Park, the method 800 includes to identify the position of the doors 38 as being in the open position. The door position sensors 62 may send a signal to the computer 56 indicating the position of the doors 38. If the doors 38 are not identified as being in the open position, the method 800 returns to its start.

The reference to block 830, based on identifying the vehicle 12 has been shifted to Park or upon identifying the doors 38 are in the open position, the method 800 includes to move the bars 24 from the raised position to the lowered position to allow passengers to enter or exit the vehicle 12. The computer 56 may send a signal to the electric motors 52 to rotate the lead screw 46 to move the bars 24 to the raised position.

The disclosure has been described in an illustrative manner, and it is to be understood that the terminology which has been used is intended to be in the nature of words of description rather than of limitation. Use of based on herein indicates a causal relationship, not merely a temporal relationship. Many modifications and variations of the present disclosure are possible in light of the above teachings, and the disclosure may be practiced otherwise than as specifically described.

The invention claimed is:

1. An assembly comprising:
   a front pillar and a rear pillar spaced along a vehicle-longitudinal axis, the front pillar and the rear pillar defining a door opening;
   a first track supported by the front pillar and a second track supported by the rear pillar; and
   a bar movably engaged with the first track and the second track from a lowered position to a raised position, the bar being elongated completely across the door opening in the raised position.

2. The assembly of claim 1, further comprising a pair of doors supported by the front pillar and the rear pillar in the door opening, the doors being movable between an open position and a closed position, the bar being in the raised position when the doors are in the closed position and the bar in the lowered position when the doors are in the open position.

3. The assembly of claim 2, wherein the bar is adjacent the doors when the doors are in the closed position and the bar is in the raised position, and the bar is below the doors when the doors are in the open position and the bar is in the lowered position.

4. The assembly of claim 1, further comprising a pair of doors supported by the front pillar and the rear pillar in the door opening, the bar being vehicle-inboard of the doors when the doors are in a closed position and the bar is in the raised position.

5. The assembly of claim 1, further comprising a second bar movably engaged with the front pillar and the rear pillar, the second bar being movable along the front pillar and the rear pillar between a lowered position to a raised position, the second bar elongated completely across the door opening in the raised position.

6. The assembly of claim 5, wherein the bar and the second bar are spaced from each other in the raised positions.

7. The assembly of claim 5, further comprising a rocker extending from the front pillar to the rear pillar and defining a slot elongated from the front pillar to the rear pillar, the slot receiving at least one of the bar and the second bar in the lowered positions.

8. The assembly of claim 5, wherein the bar and the second bar are vehicle-inboard of the door opening.

9. The assembly of claim 5, wherein the second bar is moveably engaged with the first track and the second track.

10. The assembly of claim 1, further comprising a rocker extending from the front pillar to the rear pillar, the bar being elongated along the rocker in the raised position and the lowered position.

11. The assembly of claim 10, wherein the rocker defines a slot elongated from the front pillar to the rear pillar, the slot receiving the bar when the bar is in the lowered position.

12. The assembly of claim 11, further comprising a vehicle floor supported by the rocker, the slot being between the vehicle floor and the rocker.

13. The assembly of claim 10, further comprising a vehicle floor supported by the rocker, the bar being between the vehicle floor and the rocker in the lowered position.

14. The assembly of claim 10, wherein the bar is vehicle-inboard of the rocker.

15. The assembly of claim 1, wherein the bar is vehicle-inboard of the door opening.

16. The assembly of claim 1, wherein the first track and the second track each extend generally vertically along the front pillar and the rear pillar, respectively.

17. The assembly of claim 1, further comprising a computer including a processor and a memory storing instructions executable by the processor to:
   identify a position of a pair of doors supported by the front pillar and the rear pillar of a vehicle as being in a closed position or an open position;
   identify the vehicle is in Drive; and
   move the bar elongated from the front pillar and the rear pillar from the lowered position to the raised position based on at least the identification of the doors being in the closed position or the identification of the vehicle being in Drive.

18. The assembly of claim 17, wherein the instructions include to identify the vehicle is in Park and move the bar from the raised position to the lowered position based on at least one of identification of the doors being in the open position or identification of the vehicle being in Park.

* * * * *